(12) United States Patent
Shibata et al.

(10) Patent No.: US 7,178,383 B2
(45) Date of Patent: Feb. 20, 2007

(54) KNOCK SENSOR

(75) Inventors: Harumasa Shibata, Tokyo (JP); Akito Yokoi, Tokyo (JP); Masao Kohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/187,918

(22) Filed: Jul. 25, 2005

(65) Prior Publication Data

US 2006/0065042 A1 Mar. 30, 2006

(30) Foreign Application Priority Data

Sep. 30, 2004 (JP) ............................ 2004-286916

(51) Int. Cl.
*G01M 15/00* (2006.01)
(52) U.S. Cl. .................... 73/35.11; 73/35.13; 73/117.3
(58) Field of Classification Search ............... 73/35.01, 73/35.07, 35.09, 35.11, 35.12, 35.13, 116, 73/117.2, 117.3, 118.1, 119 R
See application file for complete search history.

(56) References Cited

U.S. PATENT DOCUMENTS

| | | | | |
|---|---|---|---|---|
| 4,964,294 | A * | 10/1990 | Kawajiri et al. ............ | 73/35.11 |
| 6,655,352 | B2 * | 12/2003 | Subramanian et al. ... | 123/406.4 |
| 6,752,005 | B2 * | 6/2004 | Harada et al. ............. | 73/35.13 |
| 6,786,078 | B2 * | 9/2004 | Brammer .................. | 73/35.11 |
| 7,004,009 | B2 * | 2/2006 | Yokoi et al. ............... | 73/35.11 |
| 7,007,544 | B2 * | 3/2006 | Shibata et al. ............. | 73/35.11 |
| 2003/0005911 | A1 * | 1/2003 | Subramanian et al. .. | 123/406.29 |
| 2003/0200790 | A1 * | 10/2003 | Harada et al. ............. | 73/35.11 |
| 2004/0011135 | A1 * | 1/2004 | Brammer .................. | 73/652 |
| 2004/0250603 | A1 * | 12/2004 | Harada et al. ............. | 73/35.11 |
| 2005/0022582 | A1 * | 2/2005 | Barron et al. .............. | 73/35.01 |
| 2005/0155412 | A1 * | 7/2005 | Aoi et al. .................. | 73/35.07 |
| 2005/0229678 | A1 * | 10/2005 | Shibata et al. ............. | 73/35.11 |
| 2005/0262925 | A1 * | 12/2005 | Yokoi et al. ............... | 73/35.12 |
| 2006/0090543 | A1 * | 5/2006 | Shibata et al. ............. | 73/35.11 |

FOREIGN PATENT DOCUMENTS

| | | |
|---|---|---|
| DE | 199 60 325 A1 | 6/2001 |
| DE | 199 60 328 A1 | 6/2001 |
| EP | 0 359 409 A2 | 3/1990 |
| JP | 2002-257624 A | 9/2002 |

* cited by examiner

*Primary Examiner*—Eric S. McCall
(74) *Attorney, Agent, or Firm*—Sughrue Mion, PLLC (57) ABSTRACT

A stacked body constituted by a first insulating sheet, a first terminal plate, a piezoelectric element, a second terminal plate, a second insulating sheet, a weight, and a disk spring is fitted over a cylindrical portion of a base, clamped and held between a nut and a flange portion of the base, and resin-molded. Annular partial electrodes having a width narrower than a radial width of the piezoelectric element are formed on front and rear surfaces of the piezoelectric element. The first and second terminal plates have annular portions formed so as to have annular shapes having an outside diameter and an inside diameter substantially equal to those of the partial electrodes, and are stacked such that the annular portions are placed in close contact with entire surfaces of the partial electrodes.

6 Claims, 4 Drawing Sheets

KNOCK SENSOR

BACKGROUND OF THE INVENTION

1. Field of the Invention

The present invention relates to a nonresonant knock sensor mounted to an internal combustion engine by a bolt such that when a knocking vibration occurs in the internal combustion engine, the vibration is converted into a voltage signal by a piezoelectric element held in an interior portion, and the voltage signal is conducted out to an external portion as an output signal.

2. Description of the Related Art

Conventional knock sensors include a metal sleeve having: a cylindrical portion; and a flange portion formed on a lower portion of the cylindrical portion, a thread being formed on an outer peripheral surface of an upper portion of the cylindrical portion. A first annular electrode plate is fitted over the cylindrical portion so as to be positioned on the flange portion with an electrically-insulating plate interposed, an annular piezoelectric element is fitted over the cylindrical portion so as to be positioned on the first annular electrode plate, a second annular electrode plate is fitted over the cylindrical portion so as to be positioned on the annular piezoelectric element, and a weight is fitted over the cylindrical portion so as to be positioned on the second annular electrode plate with an electrically-insulating plate interposed. A nut is mounted by being screwed onto the thread, and each of the members is clamped and held between the nut and the flange portion by fastening the nut. Finally, a synthetic resin case is molded around the metal sleeve, each of the members being embedded inside the synthetic resin case. (See Patent Literature 1, for example.)

The annular piezoelectric element has electrode layers formed over entire front and rear surfaces thereof, and is polarized in a thickness direction. The first and second annular electrode plates are formed so as to have a shape having an inside diameter and an outside diameter equal to those of the annular piezoelectric element, and are respectively placed in close contact with the front and rear electrode layers of the annular piezoelectric element to ensure an electrically-connected state. In addition, connecting rod portions project outward from a peripheral edge of each of the first and second annular electrode plates, and are electrically connected to a pair of terminals of a connector portion formed so as to be integrated with the synthetic resin case.

A conventional knock sensor configured in this manner is mounted to an internal combustion engine by a bolt inserted inside a cylindrical portion of a metal bush. If knocking occurs in the internal combustion engine, component parts such as the annular piezoelectric element and the weight, etc., vibrate against each other due to the knocking vibration. The vibration is converted to a voltage signal by the annular piezoelectric element. The voltage signal is output to an external portion through a female coupler fitted into the connector portion.

Patent Literature 1: Japanese Patent Laid-Open No. 2002-257624 (Gazette)

In conventional knock sensors, the first and second annular electrode plates are formed so as to have a shape having an inside diameter and an outside diameter equal to those of the annular piezoelectric element, and electrode layers are formed on entire front and rear surfaces of the annular piezoelectric element contacting the first and second annular electrode plates. Thus, the electrostatic capacity is fixed at a level corresponding to the thickness of the annular piezoelectric element and the surface area of the electrode layers, and the level of the output signal elicited by the knocking vibration is also fixed at a predetermined level. The level of the output signal elicited by the knocking vibration can be changed by changing the thickness or the diameters of the annular piezoelectric element but it then becomes necessary to modify the external shape of the knock sensor.

In order to solve this problem, it is necessary to form the electrode layers on the front and rear surfaces of the annular piezoelectric element partially instead of forming them over the entire front and rear surfaces of the annular piezoelectric element contacting the first and second annular electrode plates. However, if the electrode layers are formed on the front and rear surfaces of the annular piezoelectric element partially, gaps corresponding to the thickness of the electrode layers arise between the first and second annular electrode plates and the annular piezoelectric element, giving rise to problems such as that described below.

Specifically, when the polarizing processes are applied to portions of the annular piezoelectric element where the electrode layers are formed, the polarizing action also affects portions around the electrode layers where the electrode layers are not formed. Thus, electric charge arising due to pyroelectric effects accompanying changes in the ambient temperature is discharged gradually and easily via the first and second annular electrode plates in the portions where the electrode layers are formed, but accumulates in the portions where the electrode layers are not formed. The electric charge that has accumulated in the portions of the annular piezoelectric element where the electrode layers are not formed gives rise to dielectric breakdown at voltages corresponding to the gaps existing between the first and second annular electrode plates and the annular piezoelectric element and is discharged toward the first and second annular electrode plates instantaneously. The electric charge transferred to the first and second annular electrode plates by this discharge is impressed on the annular piezoelectric element in the form of a circulating current. In this case, if an electric charge having a polarity equal to that of the electrode polarity of the annular piezoelectric element is impressed, the annular piezoelectric element extends momentarily in the direction of polarization, and an electric charge having reverse polarity occurs in an interior portion. Thus, in conventional knock sensor configurations, one problem has been that if the electrode layers are formed on the annular piezoelectric element partially, noise resulting from ambient temperature changes is superposed on the output signal.

SUMMARY OF THE INVENTION

The present invention aims to solve the above problems and an object of the present invention is to provide a knock sensor enabling a sensor construction to be achieved that enables output sensitivity to be changed without changing an external shape of the sensor, and also enabling generation of noise accompanying ambient temperature changes to be suppressed.

With the above object in view, a knock sensor of the present invention includes a base composed of an annular flange portion and a cylindrical portion disposed so as to extend axially from the flange portion, a penetrating aperture being formed so as to pass through the flange portion and the cylindrical portion in an axial direction; an annular piezoelectric element having electrode portions formed on front and rear surfaces thereof so as to face each other, the piezoelectric element being fitted over the cylindrical portion; and first and second terminal plates fitted over the cylindrical portion so as to hold the piezoelectric element from opposite sides, the first and second terminal plates closely contacting the electrode portions to extract an output signal from the piezoelectric element. Also provided are an annular weight fitted over the cylindrical portion to impart a vibrational force to the piezoelectric element; a first insulating sheet interposed between the first terminal plate and the flange portion to insulate the first terminal plate and the flange portion from each other electrically; a second insulating sheet interposed between the second terminal plate and the weight to insulate the second terminal plate and the weight from each other electrically; and a holding means for clamping and holding a stacked body against the flange portion, the stacked body being constituted by the first insulating sheet, the first terminal plate, the piezoelectric element, the second terminal plate, the second insulating sheet, and the weight. The knock sensor is characterized in that the electrode portions are constituted by annular partial electrodes having a width narrower than a radial width of the piezoelectric element and formed on the front and rear surfaces of the piezoelectric element, and the first and second terminal plates have annular portions formed so as to have annular shapes having an outside diameter and an inside diameter substantially equal to those of the partial electrodes, and are stacked such that the annular portions are placed in close contact with entire surfaces of the partial electrodes.

According to the present invention, regions of a piezoelectric element where partial electrodes are not formed (regions where electrodes are not formed) do not face annular portions of first and second terminal plates. Thus, electric charge arising due to pyroelectric effects accompanying ambient temperature changes in the regions of the piezoelectric element where electrodes are not formed is prevented from discharging toward the annular portions. As a result, stable output can be obtained without noise resulting from the ambient temperature changes being superposed on the output signal even when partial electrodes are formed on the piezoelectric element.

Electrode surface area can be changed by changing the width of the partial electrodes, thereby changing the electrostatic capacity of the piezoelectric element. The annular portions of the first and second terminal plates are formed so as to have an annular shape having an inside diameter and an outside diameter equal to those of the partial electrodes, and do not exceed the outside diameter of the piezoelectric element. Thus, knock sensors having different output sensitivities can be achieved with an identical external shape, that is, without changing the external shape of the sensor.

DETAILED DESCRIPTION OF THE PREFERRED EMBODIMENTS

Embodiment 1

Figure 1:
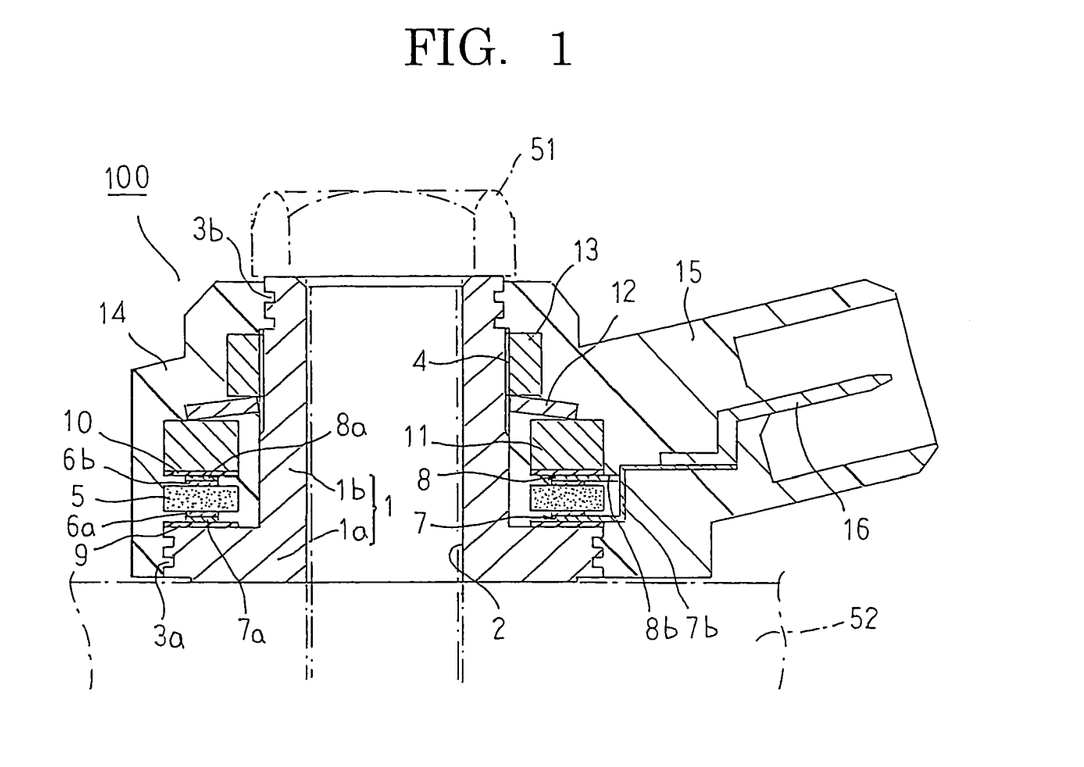
FIG. 1 is a longitudinal section showing a knock sensor according to Embodiment 1 of the present invention.
Figure 2:
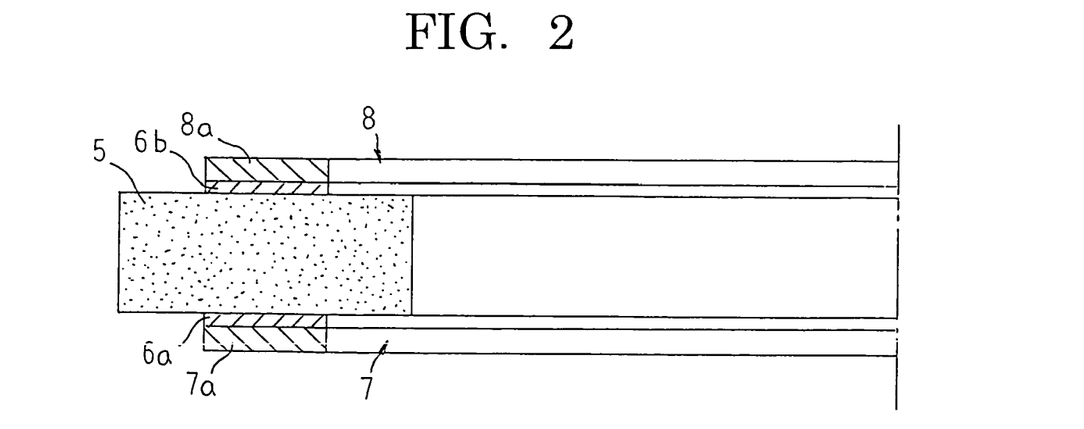
FIG. 2 is an enlarged cross section explaining part of the knock sensor according to Embodiment 1 of the present invention.

FIG. 1 is a longitudinal section showing a knock sensor according to Embodiment 1 of the present invention, and FIG. 2 is an enlarged cross section explaining part of the knock sensor according to Embodiment 1 of the present invention.

In FIGS. 1 and 2, a base 1 is made of a metal material such as SWCH (carbon steel wire for cold heading and cold forging), etc., for example, and includes: an annular flange portion 1a; and a cylindrical portion 1b extending axially from the flange portion 1a, a penetrating aperture 2 being formed so as to pass through the flange portion 1a and the cylindrical portion 1b in an axial direction. A plurality of engaging grooves 3a and 3b are formed on an outer peripheral surface of the flange portion 1a and a leading end outer peripheral surface of the cylindrical portion 1b, respectively. In addition, an external screw thread portion 4 is cut in a predetermined region of an outer peripheral surface near the leading end of the cylindrical portion 1b.

A piezoelectric element 5 is produced into a flat annular plate, for example, using a piezoelectric material such as a $Pb(Zr,Ti)O_3$ or $PbTiO_3$ piezoelectric ceramic, a $LiNbO_3$ piezoelectric monocrystal, etc., and is fitted over the cylindrical portion 1b of the base 1. Partial electrodes 6a and 6b are formed facing each other at radially-central portions on front and rear surfaces of the piezoelectric element 5 so as to be concentric with the piezoelectric element 5 and so as to have an annular shape having a width that is narrower than a radial width of the piezoelectric element 5. These partial electrodes 6a and 6b are obtained, for example, by applying an electrically-conductive material such as a silver paste, etc., to a predetermined thickness (from several microns to ten or more microns) and baking it. Here, a "partial electrode" means an annular electrode formed so as to partially cover the surface of the piezoelectric element on which the electrode is formed, in contrast to a "full surface electrode" formed so as to fully cover the surface of the piezoelectric element on which the electrode is formed. Polarizing processes are applied to the partial electrodes 6a and 6b of this piezoelectric element 5. The piezoelectric element 5 has an electrostatic capacity corresponding to its thickness and the surface area of the partial electrodes 6a and 6b, and this electrostatic capacity is a factor determining the output sensitivity of the knock sensor.

First and second terminal plates 7 and 8 are produced, for example, using an electrically-conductive metal material such as copper, a stainless alloy, etc., and include: annular portions 7a and 8a having an inside diameter and an outside diameter substantially equal to those of the partial electrodes 6a and 6b; and connecting terminal portions 7b and 8b project radially outward from outer peripheral edge portions of the annular portions 7a and 8a. These first and second terminal plates 7 and 8 are fitted over the cylindrical portion 1b such that the annular portions 7a and 8a cover the partial electrodes 6a and 6b from opposite sides of the piezoelectric element 5. The connecting terminal portions 7b and 8b are bent twice into a crank or zigzag shape, and are joined to respective electrical terminals 16 of a connector portion 15 described below.

A first insulating sheet 9 is formed so as to have an annular shape, for example, using an electrically-insulating resin film such as a polyester film, etc. This first insulating sheet 9 is interposed between the annular portion 7a of the first terminal plate 7 and the flange portion 1a to ensure electrical insulation between the first terminal plate 7 and the base 1. A second insulating sheet 10 is formed so as to have an annular shape, for example, using an electrically-insulating resin film such as a polyester film, etc. This second insulating sheet 10 is interposed between the annular portion 8a of the second terminal plate 8 and a weight 11 described below to ensure electrical insulation between the second terminal plate 8 and the weight 11.

The weight 11 imparts vibrational force to the piezoelectric element 5. This weight 11 is formed so as to have an annular shape, for example, using a metal material such as iron, etc., and is fitted over the cylindrical portion 1b so as to face the piezoelectric element 5 from an opposite side of the annular portions 8a of the second terminal plate 8 and the second insulating sheet 10. A disk spring 12 is disposed on an opposite side of the weight 11 from the piezoelectric element. A nut 13 is screwed onto the external screw thread portion 4 of the cylindrical portion 1b, and clamps and holds a stacked body against the flange portion 1a, the stacked body being constituted by the first insulating sheet 9, the annular portion 7a of the first terminal plate 7, the piezoelectric element 5, the annular portion 8a of the second terminal plate 8, the second insulating sheet 10, the weight 11, and the disk spring 12 fitted over the cylindrical portion 1b. Here, a holding means is constituted by the disk spring 12 and the nut 13.

A resin case 14 is produced by resin-molding outer peripheral sides of the base 1 except for an outer periphery at two axial ends of the base 1, for example, using an electrically-insulating synthetic resin such as nylon 66, etc. Thus, the stacked body of component parts described above that is clamped and held between the flange portion 1a and the nut 13 is embedded inside the resin case 14. The connector portion 15 includes a pair of electrical terminals 16 for extracting the output signal, and is molded integrally into the resin case 14 so as to project outward from an outer periphery of the resin case 14.

A method for assembling a knock sensor 100 configured in this manner will now be explained.

First, the first insulating sheet 9 is fitted over the cylindrical portion 1b, and installed on the flange portion 1a. Next, the annular portion 7a of the first terminal plate 7, the piezoelectric element 5, the annular portion 8a of the second terminal plate 8, the second insulating sheet 10, the weight 11, and the disk spring 12 are fitted over the cylindrical portion 1b sequentially using outside diameters for reference. Thus, the first insulating sheet 9, the annular portion 7a of the first terminal plate 7, the piezoelectric element 5, the annular portion 8a of the second terminal plate 8, the second insulating sheet 10, the weight 11, and the disk spring 12 are stacked on the flange portion 1a concentrically. Then, the nut 13 is screwed onto the external screw thread portion 4.

Next, the nut 13 is fastened with a predetermined fastening torque using a tool such as a torque wrench, etc. Thus, the stacked body constituted by the first insulating sheet 9, the annular portion 7a of the first terminal plate 7, the piezoelectric element 5, the annular portion 8a of the second terminal plate 8, the second insulating sheet 10, the weight 11, and the disk spring 12 is clamped and held between the flange portion 1a and the nut 13. Then, the connecting terminal portions 7b and 8b are joined to the electrical terminals 16 of the connector portion 15 by soldering or resistance welding, etc.

Next, the knock sensor 100 is produced by resin-molding the outer peripheral sides of the base 1, for example, using an electrically-insulating synthetic resin such as nylon 66, etc.

The knock sensor 100 configured in this manner is mounted by fastening a bolt 51 inserted inside the cylindrical portion 1b of the base 1 to an internal combustion engine 52. If knocking occurs in the internal combustion engine 52, component parts such as the piezoelectric element 5 and the weight 11, etc., vibrate against each other due to the knocking vibration. The vibration is converted to a voltage signal by the piezoelectric element 5. The voltage signal is output to an external portion through the first and second terminal plates 7 and 8 and the electrical terminals 16 from a female coupler (not shown) fitted into the connector portion 15.

According to Embodiment 1, partial electrodes 6a and 6b are formed facing each other at radially-central portions on front and rear surfaces of the piezoelectric element 5 so as to have an annular shape having a width that is narrower than a radial width of the piezoelectric element 5 and so as to be concentric with the piezoelectric element 5. Annular portions 7a and 8a of first and second terminal plates 7 and 8 are formed so as to have an annular shape having an inside diameter and an outside diameter substantially equal to those of the partial electrodes 6a and 6b, and are disposed so as to hold the piezoelectric element 5 from opposite sides so as to contact entire surfaces of the partial electrodes 6a and 6b. In this sensor construction, regions of the piezoelectric element 5 where the partial electrodes 6a and 6b are not formed, in other words regions where electrodes are not formed, do not face the annular portions 7a and 8a of the first and second terminal plates 7 and 8. Thus, electric charge arising due to pyroelectric effects accompanying ambient temperature changes in the regions of the piezoelectric element 5 where electrodes are not formed is prevented from discharging toward the annular portions 7a and 8a. As a result, stable output can be obtained without noise resulting from the ambient temperature changes being superposed on the output signal even when partial electrodes are formed on the piezoelectric element 5.

Electrode surface area can be changed by changing the width of the annular partial electrodes 6a and 6b. In other words, the electrostatic capacity of the piezoelectric element 5, which is a factor determining the output sensitivity of the knock sensors, can be changed by changing the width or radial positions of the partial electrodes 6a and 6b without changing the thickness or the diameter of the piezoelectric element 5. Because the annular portions 7a and 8a of the first and second terminal plates 7 and 8 are formed so as to have an annular shape having an inside diameter and an outside diameter substantially equal to those of the partial electrodes 6a and 6b, the annular portions 7a and 8a do not exceed the outside diameter of the piezoelectric element 5. Thus, by adopting this sensor construction, knock sensors having different output sensitivities can be achieved with an identical external shape, that is, without changing the external shape of the sensor.

Because the piezoelectric element 5 is formed so as to have an annular shape, and the annular portions 7a and 8a of the first and second terminal plates 7 and 8 are also formed so as to have an annular shape, these component parts can be fitted over the cylindrical portion 1b of the base 1 using outside diameters for reference when the piezoelectric element 5 and the annular portions 7a and 8a of the first and second terminal plates 7 and 8 are disposed on the base 1. Thus, the occurrence of misalignment between the partial electrodes 6a and 6b of the piezoelectric element 5 and the annular portions 7a and 8a is suppressed, and electric charge arising due to pyroelectric effects accompanying ambient temperature changes in the regions of the piezoelectric element 5 where electrodes are not formed is prevented from discharging toward the annular portions 7a and 8a.

Because a plurality of engaging grooves 3a and 3b are formed on an outer peripheral surface of the flange portion 1a and a leading end outer peripheral surface of the cylindrical portion 1b, respectively, contact surface area between the molded resin and outer peripheral surfaces at two axial ends of the base 1 is significantly increased. Thus, bonding between the molded resin and the outer peripheral surfaces at the two axial ends of the base 1 is made reliable, and water, etc., can also be prevented preemptively from entering through the interface between the molded resin and the base 1, reaching the annular portions 7a and 8a and the partial electrodes 6a and 6b, and corroding the electrode portions, etc.

Because the stacked body constituted by the first insulating sheet 9, the annular portion 7a of the first terminal plate 7, the piezoelectric element 5, the annular portion 8a of the second terminal plate 8, the second insulating sheet 10, the weight 11, and the disk spring 12 is clamped and held between the flange portion 1a and the nut 13 while being molded in the electrically-insulating synthetic resin, electrically-insulating resin is interposed between regions of the piezoelectric element 5 where electrodes are not formed and the annular portions 7a and 8a of the first and second terminal plates 7 and 8, preventing electric charge arising due to pyroelectric effects accompanying ambient temperature changes in the regions of the piezoelectric element 5 where electrodes are not formed from discharging toward the annular portions 7a and 8a.

Here, if gaps between the regions of the piezoelectric element 5 where electrodes are not formed and the first and second insulating sheets 9 and 10 are too narrow, the gaps are less likely to be filled with the electrically-insulating resin during resin molding. If air gaps are formed in these gaps, the effect preventing discharge from the regions of the piezoelectric element 5 where electrodes are not formed to the annular portions 7a and 8a is reduced. Thus, because the gaps will be completely filled with the electrically-insulating resin during resin molding if the gaps between the regions of the piezoelectric element 5 where electrodes are not formed and the first and second insulating sheets 9 and 10 are 0.3 mm, it is desirable for these gaps to be made greater than or equal to 0.3 mm. In other words, it is desirable for the thickness of the annular portions 7a and 8a to be set to greater than or equal to 0.3 mm. Moreover, there is no limit to the maximum value of the gaps because the wider the gaps are, the more easily the gaps will be filled with the electrically-insulating resin during resin molding. Thus, the maximum value of the gaps may be appropriately set according to the design specifications of the knock sensor.

Embodiment 2

Figure 3:
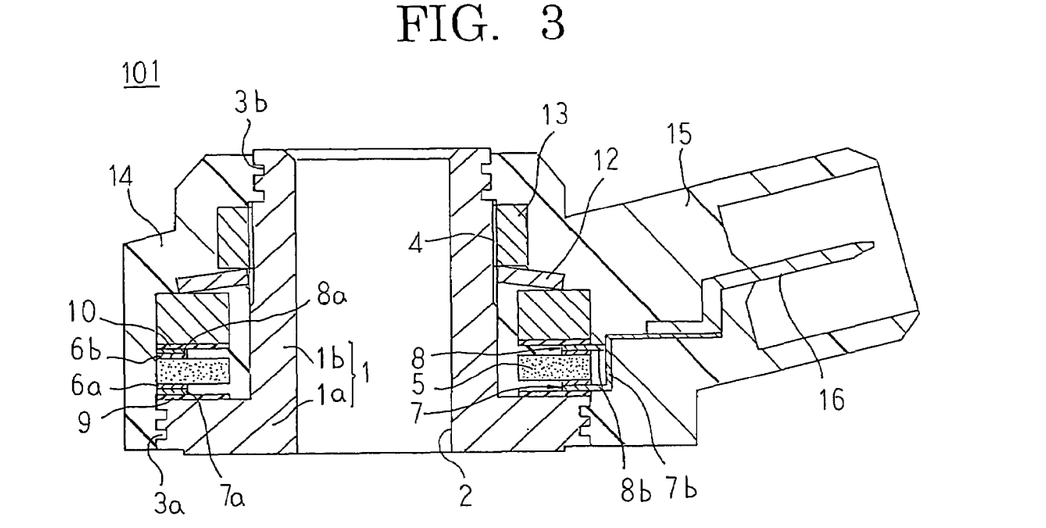
FIG. 3 is a longitudinal section showing a knock sensor according to Embodiment 2 of the present invention.
Figure 4:
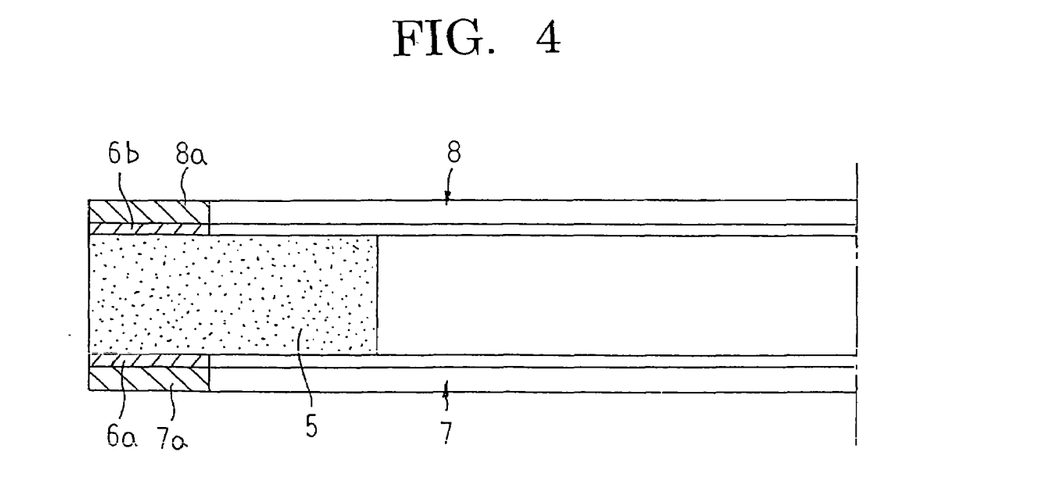
FIG. 4 is an enlarged cross section explaining part of the knock sensor according to Embodiment 2 of the present invention.

FIG. 3 is a longitudinal section showing a knock sensor according to Embodiment 2 of the present invention, and FIG. 4 is an enlarged cross section explaining part of the knock sensor according to Embodiment 2 of the present invention.

In FIGS. 3 and 4, partial electrodes 6a and 6b having a predetermined thickness (from several microns to ten or more microns) are formed facing each other at radially-outer peripheral edge portions on front and rear surfaces of a piezoelectric element 5 so as to have an annular shape having an outside diameter equal to the outside diameter of the piezoelectric element 5 and having a width that is narrower than a radial width of the piezoelectric element 5 and so as to be concentric with the piezoelectric element 5. Annular portions 7a and 8a of first and second terminal plates 7 and 8 are formed so as to have an annular shape having an inside diameter and an outside diameter substantially equal to those of the partial electrodes 6a and 6b.

Moreover, the rest of this embodiment is configured in a similar manner to Embodiment 1 above.

In Embodiment 2, the first insulating sheet 9, the annular portion 7a of the first terminal plate 7, the piezoelectric element 5, the annular portion 8a of the second terminal plate 8, the second insulating sheet 10, the weight 11, and the disk spring 12 are stacked on the flange portion 1a concentrically by fitting each over the cylindrical portion 1b of the base 1 using outside diameters for reference. Then, the nut 13 is fastened with a predetermined fastening torque using a tool such as a torque wrench, etc., to clamp and hold the stacked body constituted by the first insulating sheet 9, the annular portion 7a of the first terminal plate 7, the piezoelectric element 5, the annular portion 8a of the second terminal plate 8, the second insulating sheet 10, the weight 11, and the disk spring 12 between the flange portion 1a and the nut 13. Next, a knock sensor 101 is produced by resin-molding the outer peripheral sides of the base 1, for example, using an electrically-insulating synthetic resin such as nylon 66, etc.

In a knock sensor 101 configured in this manner, partial electrodes 6a and 6b are formed facing each other at radially-outer peripheral edge portions on front and rear surfaces of the piezoelectric element 5 so as to have an annular shape having a width that is narrower than a width of the piezoelectric element 5 and so as to be concentric with the piezoelectric element 5. Annular portions 7a and 8a of first and second terminal plates 7 and 8 are formed so as to have an annular shape having an inside diameter and an outside diameter substantially equal to those of the partial electrodes 6a and 6b, and are disposed so as to hold the piezoelectric element 5 from opposite sides so as to contact entire surfaces of the partial electrodes 6a and 6b. In addition, electrically-insulating resin is charged between regions of the piezoelectric element 5 where electrodes are not formed and the annular portions 7a and 8a of the first and second terminal plates 7 and 8.

Consequently, in Embodiment 2, in a similar manner to Embodiment 1 above, stable output can also be obtained without noise resulting from the ambient temperature changes being superposed on the output signal even when partial electrodes are formed on the piezoelectric element 5. Knock sensors having different output sensitivities can also be achieved with an identical external shape, that is, without changing the external shape of the sensor. In addition, electric charge arising due to pyroelectric effects accompanying ambient temperature changes in the regions of the piezoelectric element 5 where electrodes are not formed is prevented from discharging toward the annular portions 7a and 8a.

In Embodiment 2, because outer peripheral edge surfaces of the partial electrodes 6a and 6b, the piezoelectric element 5, and the annular portions 7a and 8a are positioned in a common plane, the connecting terminal portions 7b and 8b do not overlap with the piezoelectric element 5 relative to the thickness direction of the piezoelectric element 5. Thus, electric charge arising due to pyroelectric effects accompanying ambient temperature changes in the regions of the piezoelectric element 5 where electrodes are not formed is prevented from discharging toward the connecting terminal portions 7b and 8b, enabling more stable output to be obtained.

Moreover, in Embodiment 2 above, the partial electrodes 6a and 6b are explained as being formed at radially-outer peripheral edge portions of front and rear surfaces of the piezoelectric element 5 with outer peripheral edge surfaces thereof positioned in a common plane with an outer peripheral edge surface of the piezoelectric element 5, but the partial electrodes 6a and 6b may also be formed at the radially-outer peripheral edge portions of the front and rear surfaces of the piezoelectric element 5 so as to be offset radially inward from the outer peripheral edge surface of the piezoelectric element 5 by a predetermined amount.

Embodiment 3

Figure 5:
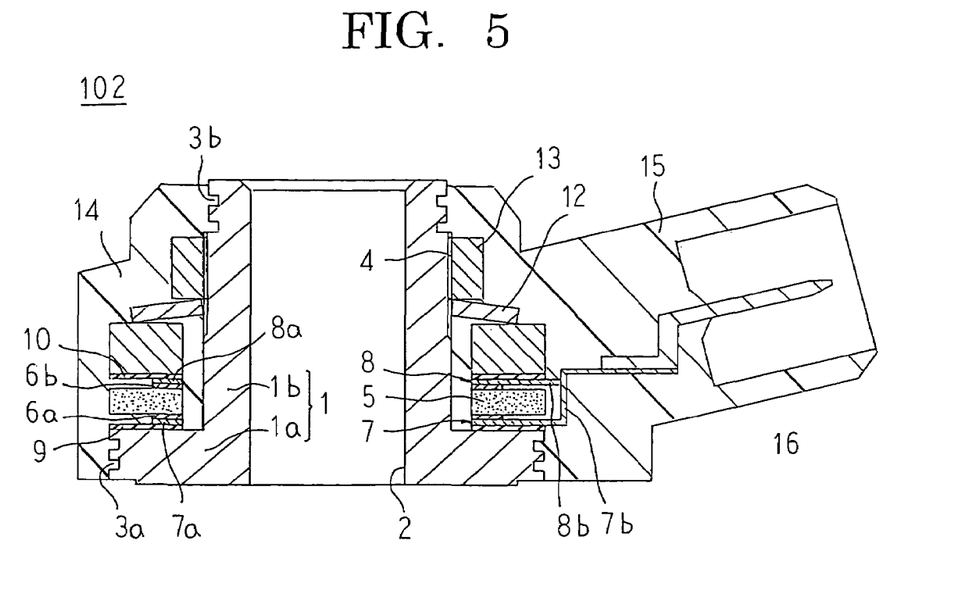
FIG. 5 is a longitudinal section showing a knock sensor according to Embodiment 3 of the present invention.
Figure 6:
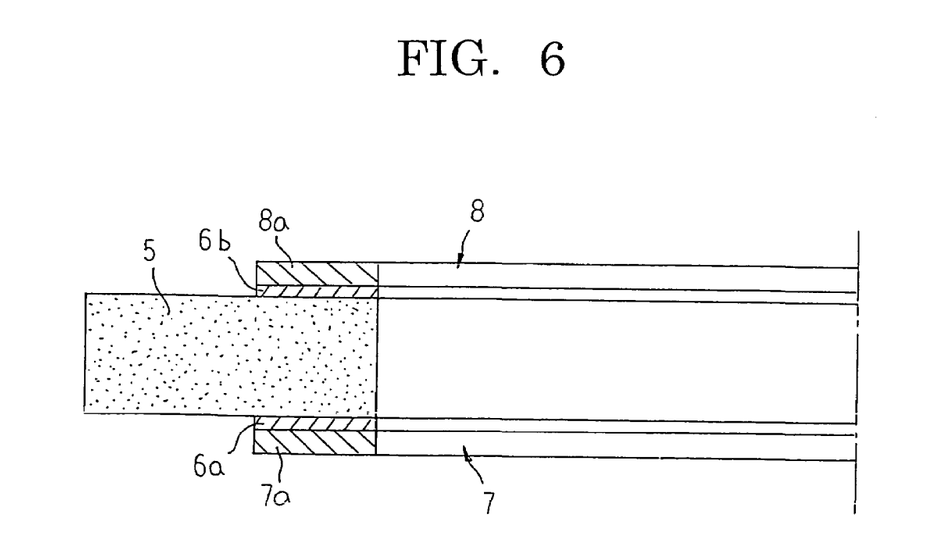
FIG. 6 is an enlarged cross section explaining part of the knock sensor according to Embodiment 3 of the present invention.

FIG. 5 is a longitudinal section showing a knock sensor according to Embodiment 3 of the present invention, and FIG. 6 is an enlarged cross section explaining part of the knock sensor according to Embodiment 3 of the present invention.

In FIGS. 5 and 6, partial electrodes 6a and 6b having a predetermined thickness (from several microns to ten or more microns) are formed facing each other at radially-inner peripheral edge portions on front and rear surfaces of a piezoelectric element 5 so as to have an annular shape having an inside diameter equal to the outside diameter of the piezoelectric element 5 and having a width that is narrower than a radial width of the piezoelectric element 5 and so as to be concentric with the piezoelectric element 5. Annular portions 7a and 8a of first and second terminal plates 7 and 8 are formed so as to have an annular shape having an inside diameter and an outside diameter substantially equal to those of the partial electrodes 6a and 6b.

Moreover, the rest of this embodiment is configured in a similar manner to Embodiment 1 above.

In Embodiment 3, the first insulating sheet 9, the annular portion 7a of the first terminal plate 7, the piezoelectric element 5, the annular portion 8a of the second terminal plate 8, the second insulating sheet 10, the weight 11, and the disk spring 12 are stacked on the flange portion 1a concentrically by fitting each over the cylindrical portion 1b of the base 1 using outside diameters for reference. Then, the nut 13 is fastened with a predetermined fastening torque using a tool such as a torque wrench, etc., to clamp and hold the stacked body constituted by the first insulating sheet 9, the annular portion 7a of the first terminal plate 7, the piezoelectric element 5, the annular portion 8a of the second terminal plate 8, the second insulating sheet 10, the weight 11, and the disk spring 12 between the flange portion 1a and the nut 13. Next, a knock sensor 102 is produced by resin-molding the outer peripheral sides of the base 1, for example, using an electrically-insulating synthetic resin such as nylon 66, etc.

In a knock sensor 102 configured in this manner, partial electrodes 6a and 6b are formed facing each other at radially-inner peripheral edge portions on front and rear surfaces of the piezoelectric element 5 so as to have an annular shape having a width that is narrower than a width of the piezoelectric element 5 and so as to be concentric with the piezoelectric element 5. Annular portions 7a and 8a of first and second terminal plates 7 and 8 are formed so as to have an annular shape having an inside diameter and an outside diameter substantially equal to those of the partial electrodes 6a and 6b, and are disposed so as to hold the piezoelectric element 5 from opposite sides so as to contact entire surfaces of the partial electrodes 6a and 6b. In addition, electrically-insulating resin is charged between regions of the piezoelectric element 5 where electrodes are not formed and the annular portions 7a and 8a of the first and second terminal plates 7 and 8.

Consequently, in Embodiment 3, in a similar manner to Embodiment 1 above, stable output can also be obtained without noise resulting from the ambient temperature changes being superposed on the output signal even when partial electrodes are formed on the piezoelectric element 5. Knock sensors having different output sensitivities can also be achieved with an identical external shape, that is, without changing the external shape of the sensor. In addition, electric charge arising due to pyroelectric effects accompanying ambient temperature changes in the regions of the piezoelectric element 5 where electrodes are not formed is prevented from discharging toward the annular portions 7a and 8a.

Moreover, in Embodiment 3 above, the partial electrodes 6a and 6b are explained as being formed at radially-inner peripheral edge portions of front and rear surfaces of the piezoelectric element 5 with inner peripheral edge surfaces thereof positioned in a common plane with an inner peripheral edge surface of the piezoelectric element 5, but the partial electrodes 6a and 6b may also be formed at the radially-inner peripheral edge portions of the front and rear surfaces of the piezoelectric element 5 so as to be offset radially outward from the inner peripheral edge surface of the piezoelectric element 5 by a predetermined amount.

Embodiment 4

Figure 7:
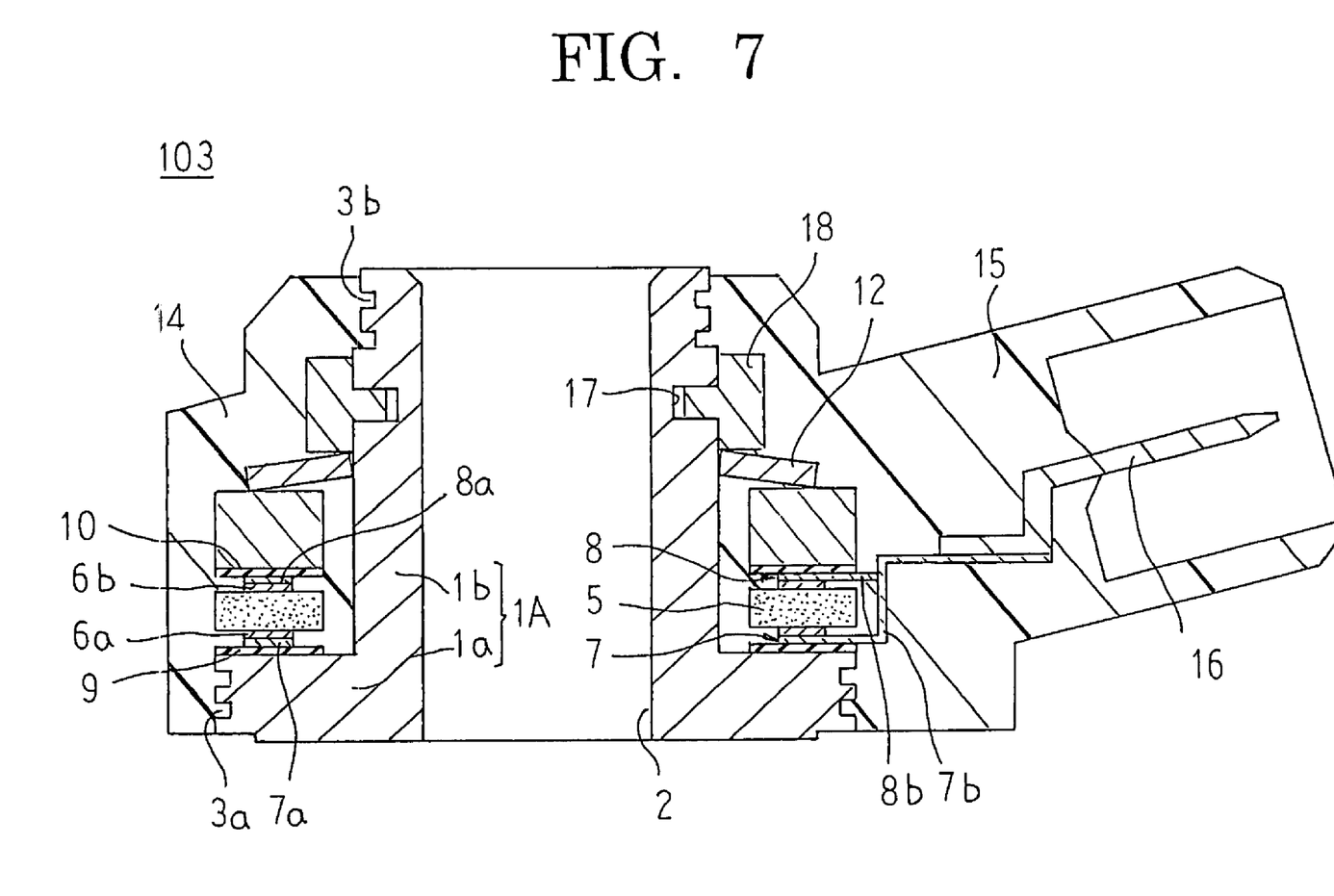
FIG. 7 is a longitudinal section showing a knock sensor according to Embodiment 4 of the present invention.

FIG. 7 is a longitudinal section showing a knock sensor according to Embodiment 4 of the present invention.

In FIG. 7, a base 1A is made of a metal material such as a steel material, etc., for example, and includes: an annular flange portion 1a; and a cylindrical portion 1b extending axially from the flange portion 1a, a penetrating aperture 2 being formed so as to pass through the flange portion 1a and the cylindrical portion 1b in an axial direction. A plurality of engaging grooves 3a and 3b are formed on an outer peripheral surface of the flange portion 1a and a leading end outer peripheral surface of the cylindrical portion 1b, respectively. In addition, a securing groove 17 is formed in a an outer peripheral surface near the leading end of the cylindrical portion 1b.

A stopper ring 18 is fixed to the securing groove 17 by crimping, and clamps and holds a stacked body against the flange portion 1a, the stacked body being constituted by a first insulating sheet 9, an annular portion 7a of a first terminal plate 7, a piezoelectric element 5, an annular portion 8a of a second terminal plate 8, a second insulating sheet 10, a weight 11, and a disk spring 12 fitted over the cylindrical portion 1b. Here, a holding means is constituted by the disk spring 12 and the stopper ring 18.

Moreover, the rest of this embodiment is configured in a similar manner to Embodiment 1 above.

In Embodiment 4, the first insulating sheet 9, the annular portion 7a of the first terminal plate 7, the piezoelectric element 5, the annular portion 8a of the second terminal plate 8, the second insulating sheet 10, the weight 11, and the disk spring 12 are stacked on the flange portion 1a concentrically by fitting each over the cylindrical portion 1b of the base 1 using outside diameters for reference. Then, the stopper ring 18 is fitted over the cylindrical portion 1b and stacked on a stacked body constituted by the first insulating sheet 9, the annular portion 7a of the first terminal plate 7, the piezoelectric element 5, the annular portion 8a of the second terminal plate 8, the second insulating sheet 10, the weight 11, and the disk spring 12, and the stopper ring 18 is fixed to the securing groove 17 by crimping while the stacked body is pressed with a predetermined pressing force. Thus, the stacked body constituted by the first insulating sheet 9, the annular portion 7a of the first terminal plate 7, the piezoelectric element 5, the annular portion 8a of the second terminal plate 8, the second insulating sheet 10, the weight 11, and the disk spring 12 is clamped and held between the flange portion 1a and the stopper ring 18. Next, a knock sensor 103 is produced by resin-molding the outer peripheral sides of the base 1A, for example, using an electrically-insulating synthetic resin such as nylon 66, etc.

In a knock sensor 103 configured in this manner, partial electrodes 6a and 6b are formed facing each other at radially-central portions on front and rear surfaces of the piezoelectric element 5 so as to have an annular shape having a width that is narrower than a width of the piezoelectric element 5 and so as to be concentric with the piezoelectric element 5. Annular portions 7a and 8a of first and second terminal plates 7 and 8 are formed so as to have an annular shape having an inside diameter and an outside diameter substantially equal to those of the partial electrodes 6a and 6b, and are disposed so as to hold the piezoelectric element 5 from opposite sides so as to contact entire surfaces of the partial electrodes 6a and 6b. In addition, electrically-insulating resin is charged between regions of the piezoelectric element 5 where electrodes are not formed and the annular portions 7a and 8a of the first and second terminal plates 7 and 8.

Consequently, in Embodiment 4, in a similar manner to Embodiment 1 above, stable output can also be obtained without noise resulting from the ambient temperature changes being superposed on the output signal even when partial electrodes are formed on the piezoelectric element 5. Knock sensors having different output sensitivities can also be achieved with an identical external shape, that is, without changing the external shape of the sensor. In addition, electric charge arising due to pyroelectric effects accompanying ambient temperature changes in the regions of the piezoelectric element 5 where electrodes are not formed is prevented from discharging toward the annular portions 7a and 8a.

Moreover, in each of the above embodiments, annular portions 7a and 8a of first and second terminal plates 7 and 8 are explained as being formed so as to have an annular shape having an inside diameter and an outside diameter substantially equal to those of the partial electrodes 6a and 6b. Here, "substantially equal" does not mean that the inside diameter and the outside diameter of the annular portions 7a and 8a are limited to aligning completely with the inside diameter and the outside diameter of the partial electrodes 6a and 6b, and allows for irregularities within a range of dimensional tolerances for manufacturing.

What is claimed is:

1. A knock sensor comprising:
   a base having:
      an annular flange portion; and
      a cylindrical portion disposed so as to extend axially from said flange portion, a penetrating aperture being formed so as to pass through said flange portion and said cylindrical portion in an axial direction;
   an annular piezoelectric element having electrode portions formed on front and rear surfaces thereof so as to face each other, said piezoelectric element being fitted over said cylindrical portion;
   first and second terminal plates fitted over said cylindrical portion so as to hold said piezoelectric element from opposite sides, said first and second terminal plates closely contacting said electrode portions to extract an output signal from said piezoelectric element;
   an annular weight fitted over said cylindrical portion to impart a vibrational force to said piezoelectric element;
   a first insulating sheet interposed between said first terminal plate and said flange portion to insulate said first terminal plate and said flange portion from each other electrically;
   a second insulating sheet interposed between said second terminal plate and said weight to insulate said second terminal plate and said weight from each other electrically; and
   a holding means for clamping and holding a stacked body against said flange portion, said stacked body being constituted by said first insulating sheet, said first terminal plate, said piezoelectric element, said second terminal plate, said second insulating sheet, and said weight,
   wherein:
   said electrode portions are constituted by annular partial electrodes having a width narrower than a radial width of said piezoelectric element and formed on said front and rear surfaces of said piezoelectric element, and
   said first and second terminal plates have annular portions formed so as to have annular shapes having an outside diameter and an inside diameter substantially equal to those of said partial electrodes, and are stacked such that said annular portions are placed in close contact with entire surfaces of said partial electrodes.

2. The knock sensor according to claim 1, wherein:
   said partial electrodes are formed at a radially-central portion of said front and rear surfaces of said piezoelectric element so as to be concentric with said piezoelectric element.

3. The knock sensor according to claim 1, wherein:
   said partial electrodes are formed at a radially-outer peripheral edge portion of said front and rear surfaces of said piezoelectric element so as to be concentric with said piezoelectric element.

4. The knock sensor according to claim 1, wherein:
   said partial electrodes are formed at a radially-inner peripheral edge portion of said front and rear surfaces of said piezoelectric element so as to be concentric with said piezoelectric element.

5. The knock sensor according to claim 1, wherein:
   a gap between regions of said front and rear surfaces of said piezoelectric element where said partial electrodes are not formed and said first and second insulating sheets is filled with an electrically-insulating resin.

6. The knock sensor according to claim 5, wherein:
   said gap between said regions of said front and rear surfaces of said piezoelectric element where said partial electrodes are not formed and said first and second insulating sheets is greater than or equal to 0.3 mm.

* * * * *